(12) United States Patent
Rael

(10) Patent No.: US 8,632,037 B1
(45) Date of Patent: Jan. 21, 2014

(54) HOSE HOLDER

(76) Inventor: Koreann H. Rael, Preston, ID (US)

( * ) Notice: Subject to any disclaimer, the term of this patent is extended or adjusted under 35 U.S.C. 154(b) by 116 days.

(21) Appl. No.: 13/084,123

(22) Filed: Apr. 11, 2011

(51) Int. Cl.
*B60B 15/06* (2006.01)

(52) U.S. Cl.
USPC ............................ 248/79; 248/75; 248/534

(58) Field of Classification Search
CPC ........ F16L 3/003; F21V 21/088; A01K 97/10
USPC .............. 248/79, 75, 205.1, 213.2, 77, 312.1,
248/228.6, 230.6, 231.71, 51, 534, 535,
248/538, 540, 541, 539; 138/106; 43/21.2
See application file for complete search history.

(56) References Cited

U.S. PATENT DOCUMENTS

| 307,324 | A | * | 10/1884 | Pattison | 137/151 |
|---|---|---|---|---|---|
| 1,118,197 | A | | 11/1914 | Glass | |
| 1,627,734 | A | * | 5/1927 | Gavaza | 248/79 |
| 1,746,151 | A | * | 2/1930 | Goldman | 248/79 |
| 1,803,529 | A | * | 5/1931 | Hyatt | 248/79 |
| 2,092,426 | A | * | 9/1937 | Riddell | 4/558 |
| 2,189,364 | A | * | 2/1940 | Kirsten | 248/79 |
| 2,199,034 | A | * | 4/1940 | Witczak | 248/514 |
| 2,592,053 | A | * | 4/1952 | Megla | 248/79 |
| 2,602,618 | A | * | 7/1952 | Cohen | 43/21.2 |
| 2,617,616 | A | * | 11/1952 | Lavender | 248/515 |
| 2,626,770 | A | * | 1/1953 | Norman | 248/534 |
| 2,671,626 | A | * | 3/1954 | Schmadeke | 248/75 |
| D183,553 | S | | 9/1958 | Bayuk | |
| 2,961,209 | A | * | 11/1960 | Willey | 248/515 |
| 3,204,902 | A | * | 9/1965 | David | 248/79 |
| 3,823,905 | A | | 7/1974 | Ray | |
| D251,202 | S | | 2/1979 | Charewicz | |
| 4,603,501 | A | * | 8/1986 | Radcliff | 43/21.2 |
| D290,809 | S | | 7/1987 | Elliott | |
| 5,011,034 | A | | 4/1991 | Abel | |
| 5,088,666 | A | | 2/1992 | Lang | |
| D408,269 | S | | 4/1999 | Ross | |
| 6,109,569 | A | | 8/2000 | Sakaida | |
| 7,204,462 | B2 | * | 4/2007 | Lembo | 248/75 |

* cited by examiner

*Primary Examiner* — Anita M King

(57) ABSTRACT

A hose holder is provided for securing a hose in a desired position to direct fluid from the hose into a desired location such as a container. The holder may include a mounting bracket configured for coupling to a support structure or may be integral to a container. A guide member is coupled to the mounting bracket or container. A pair of spaced skewed rings is coupled to the guide member. The rings are configured for receiving a hose therethrough whereby the rings hold the hose in a static position relative to the guide member.

10 Claims, 5 Drawing Sheets

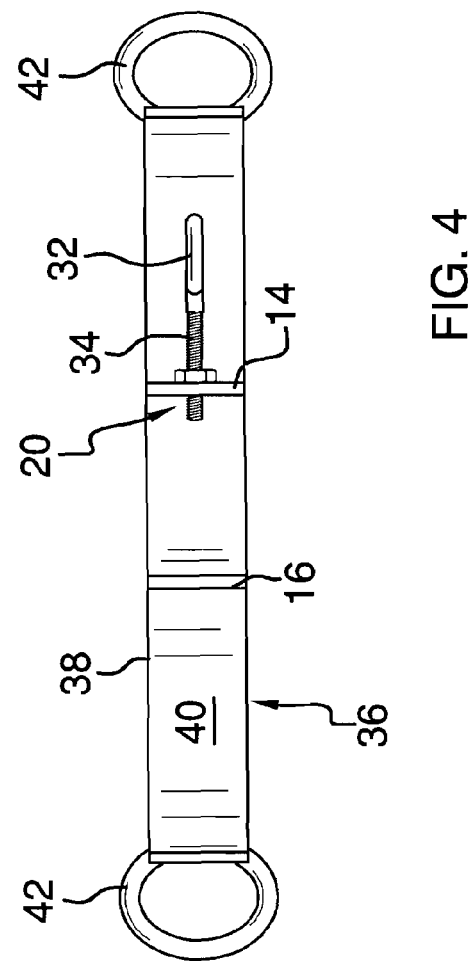
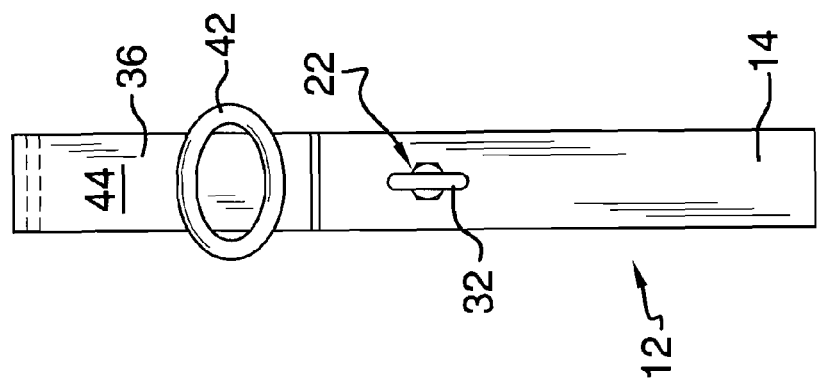
FIG. 4
FIG. 3

HOSE HOLDER

BACKGROUND OF THE DISCLOSURE

1. Field of the Disclosure

The disclosure relates to hose holding devices and more particularly pertains to a new hose holding device for securing a hose in a desired position to direct fluid from the hose into a desired location.

2. Summary of the Disclosure

An embodiment of the disclosure meets the needs presented above by generally comprising a mounting bracket configured for coupling to a support structure. A guide member is coupled to the mounting bracket. A pair of spaced skewed rings is coupled to the guide member. The rings are configured for receiving a hose therethrough whereby the rings hold the hose in a static position relative to the guide member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a bottom view of an embodiment of the disclosure.

DESCRIPTION OF THE PREFERRED EMBODIMENT

Figure 1:
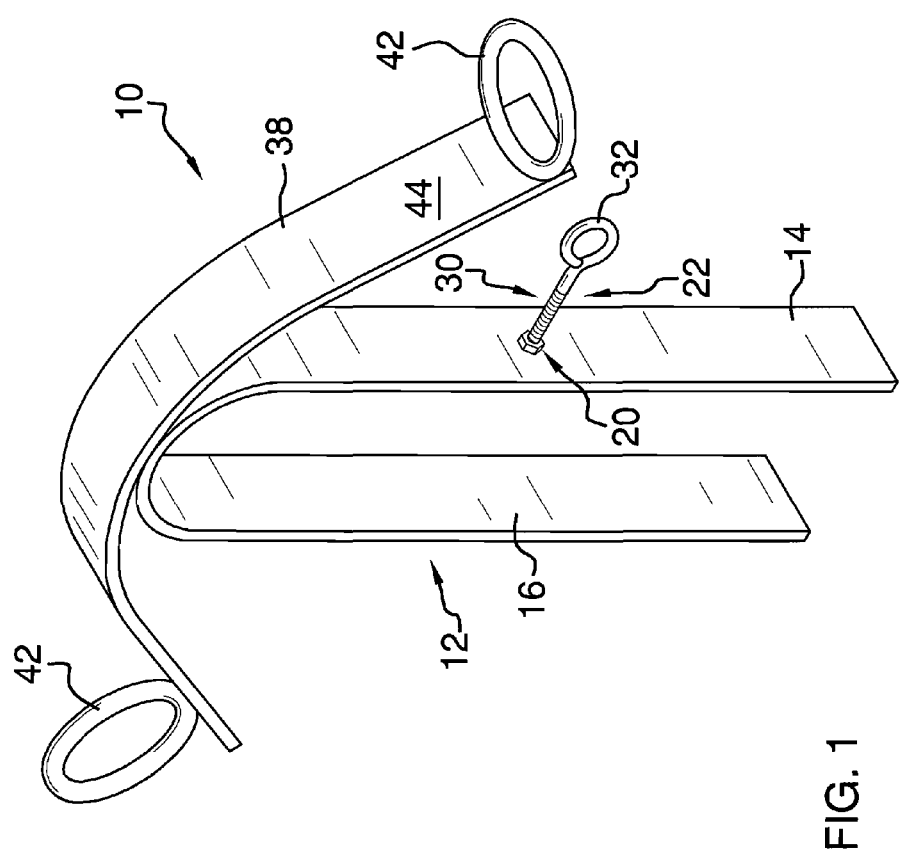
FIG. 1 is a top front side perspective view of a hose holder according to an embodiment of the disclosure.
Figure 2:
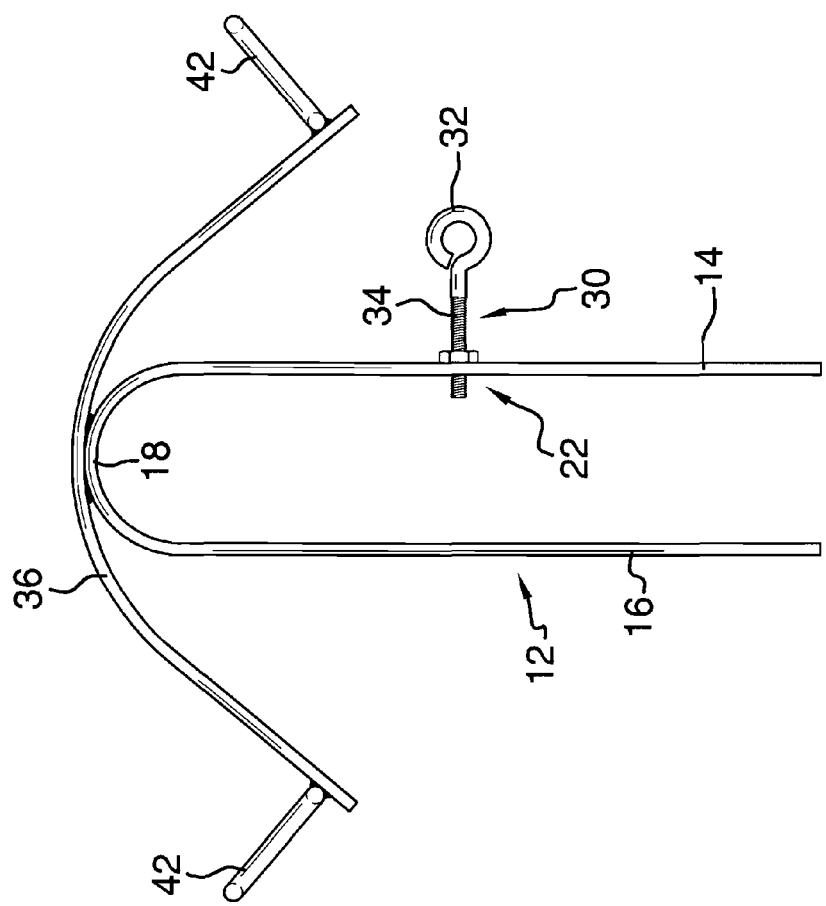
FIG. 2 is a side view of an embodiment of the disclosure.
Figure 5:
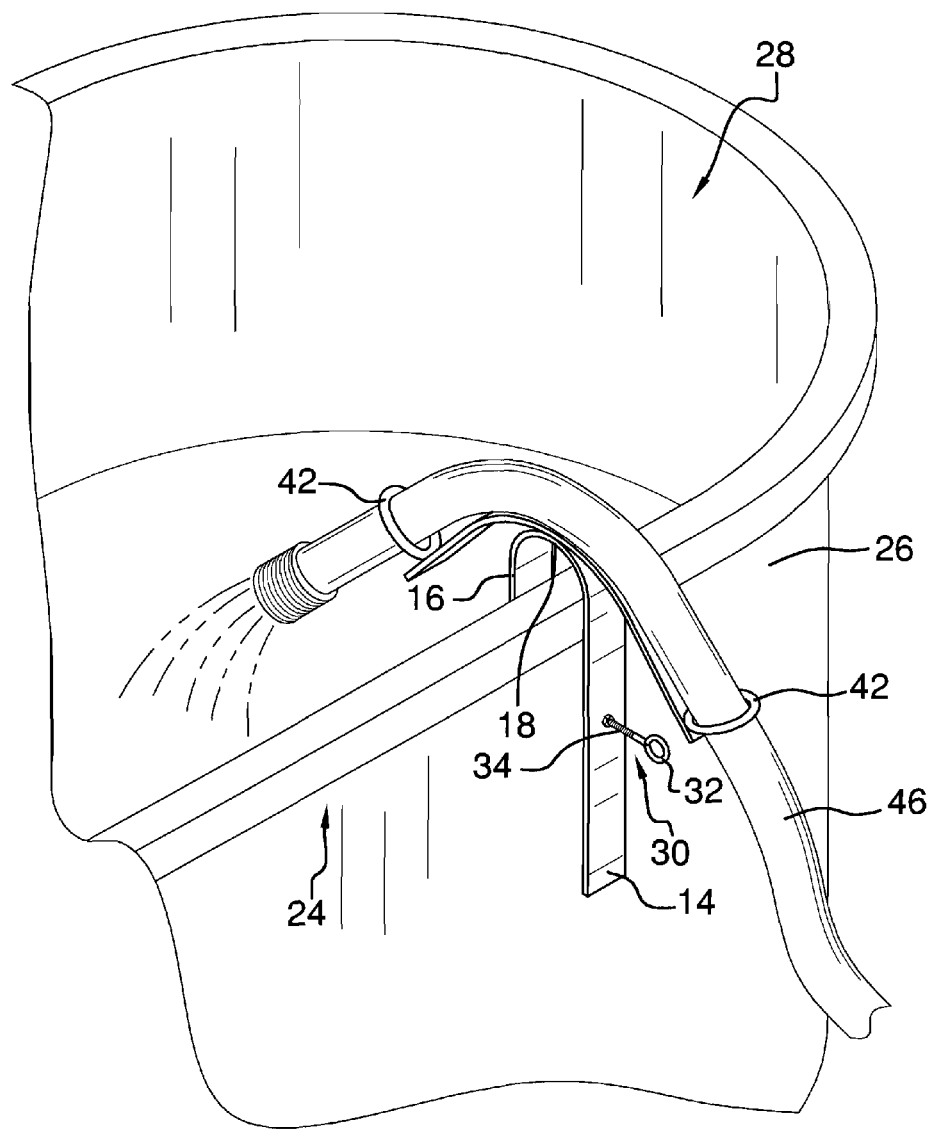
FIG. 5 is a top front side perspective view of an embodiment of the disclosure in use.

With reference now to the drawings, and in particular to FIGS. 1 through 6 thereof, a new hose holding device embodying the principles and concepts of an embodiment of the disclosure and generally designated by the reference numeral 10 will be described.

As best illustrated in FIGS. 1 through 6, the hose holder 10 generally comprises a mounting bracket 12 having a pair of straight opposed end portions 14,16 and a medial portion 18 extending between the end portions 14,16. The medial portion 18 of the mounting bracket 12 may be arcuate. A threaded aperture 20 extends through one of the end portions 14 of the mounting bracket 12. A clamping member 22 is coupled to the mounting bracket 12 whereby the mounting bracket 12 is configured for coupling to a support structure 24 such as a wall 26 of a container 28. The clamping member 22 may be a thumbscrew 30 having a head 32 and a threaded post 34 extending from the head 32. The threaded post 34 is engageable to the threaded aperture 20.

A guide member 36 is coupled to the mounting bracket 12. The guide member 36 may be an arcuate band 38. The mounting bracket 12 is coupled to an inwardly facing surface 40 of the guide member 36. A pair of spaced skewed rings 42 is coupled to the guide member 36. The rings 42 extend outwardly from an outwardly facing surface 44 of the arcuate band 38. The rings 42 are configured for receiving a hose 46 therethrough. The rings 42 hold the hose 46 in a static position relative to the guide member 36.

Figure 6:
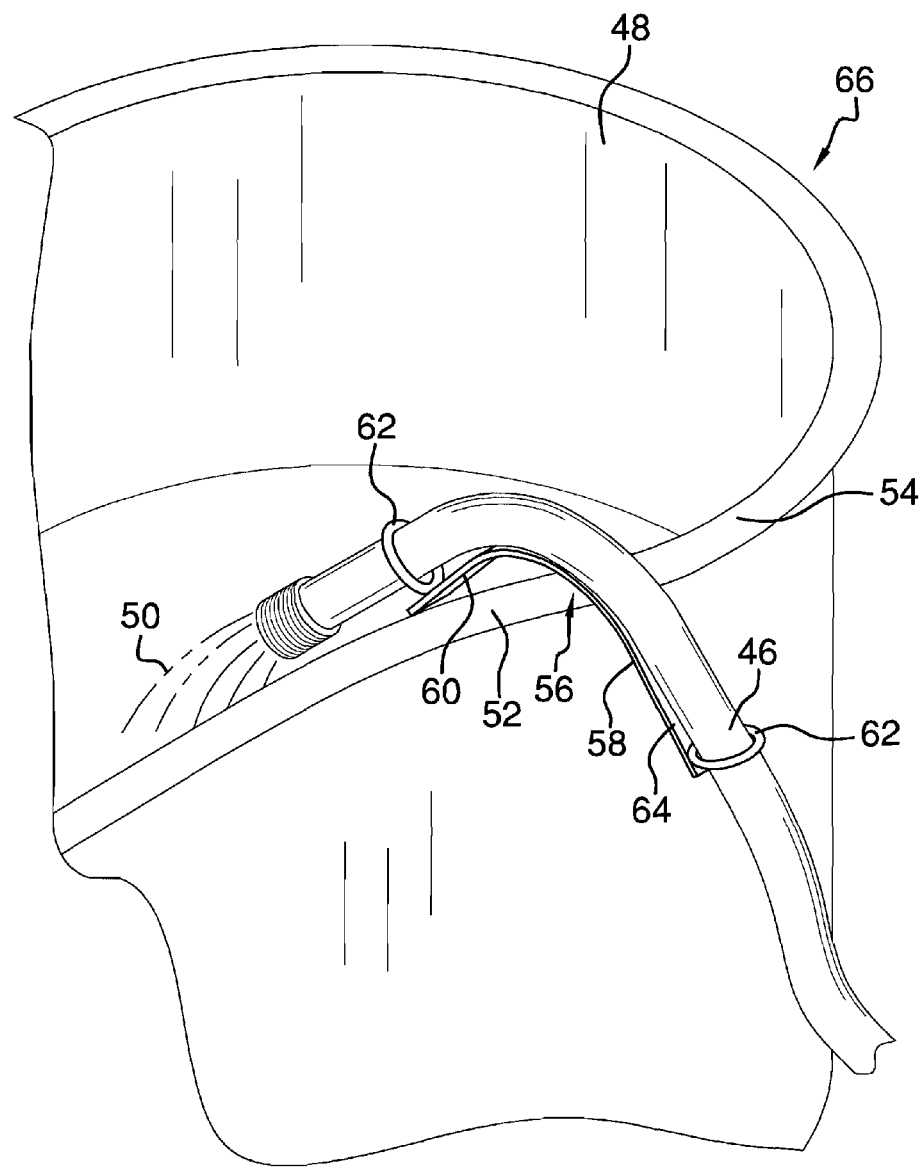
FIG. 6 is a top front side perspective view of an embodiment of the disclosure in use.

Alternatively, as shown in FIG. 6, a container 48 is configured for holding a fluid 50. The container 48 has a perimeter wall 52 having an upper edge 54. A guide member 56 is coupled directly to the container 48. The guide member 56 may be an arcuate band 58. The upper edge 54 of the container 48 is coupled to an inwardly facing surface 60 of the guide member 56. A pair of spaced skewed rings 62 is coupled to the guide member 56. The rings 62 extend outwardly from an outwardly facing surface 64 of the arcuate band 58. The rings 62 are configured for receiving the hose 46 therethrough whereby the rings 62 hold the hose 44 in a static position relative to the guide member 56.

In use, the mounting bracket 12 is attached to the wall 26 of the container 28. The hose 46 is threaded through the rings 42 and the curvature of the guide member 36 in combination with the rings 42 holds the hose 46 in place to fill the container 28. The alternate embodiment 66 works in the same manner except that the guide member 56 is integrally coupled to the container 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A hose holder assembly comprising:
    a mounting bracket configured for coupling to a support structure, said mounting bracket including a pair of straight opposed end portions and a medial portion extending between said end portions;
    a guide member coupled to said mounting bracket, said guide member being an arcuate band;
    a pair of spaced skewed rings coupled to said guide member, said rings being configured for receiving a hose therethrough whereby said rings hold the hose in a static position relative to said guide member; and
    a clamping member coupled to said mounting bracket whereby said mounting bracket is configured for coupling to the support structure.

2. The assembly of claim 1, wherein said rings extend outwardly from an outwardly facing surface of said arcuate band.

3. The assembly of claim 1, wherein said medial portion of said mounting bracket is arcuate.

4. The assembly of claim 1, further comprising:
- a threaded aperture extending through one of said end portions of said mounting bracket; and
- said clamping member being a thumbscrew having a head and a threaded post extending from said head, said threaded post being engageable to said threaded aperture.

5. The assembly of claim 1, wherein said mounting bracket is coupled to an inwardly facing surface of said guide member.

6. A hose holder assembly comprising:
- a mounting bracket, said mounting bracket including a pair of straight opposed end portions and a medial portion extending between said end portions, said medial portion of said mounting bracket being arcuate, a threaded aperture extending through one of said end portions of said mounting bracket;
- a clamping member coupled to said mounting bracket whereby said mounting bracket is configured for coupling to a support structure, said clamping member being a thumbscrew having a head and a threaded post extending from said head, said threaded post being engageable to said threaded aperture;
- a guide member coupled to said mounting bracket, said guide member being an arcuate band, said mounting bracket being coupled to an inwardly facing surface of said guide member; and
- a pair of spaced skewed rings coupled to said guide member, said rings extending outwardly from an outwardly facing surface of said arcuate band, said rings being configured for receiving a hose therethrough whereby said rings hold the hose in a static position relative to said guide member.

7. A hose holder assembly comprising:
- a mounting bracket configured for coupling to a support structure, said mounting bracket including a pair of straight opposed end portions and a medial portion extending between said end portions, said medial portion of said mounting bracket being arcuate;
- a guide member coupled to said mounting bracket;
- a pair of spaced skewed rings coupled to said guide member, said rings being configured for receiving a hose therethrough whereby said rings hold the hose in a static position relative to said guide member; and
- a clamping member coupled to said mounting bracket whereby said mounting bracket is configured for coupling to the support structure.

8. The assembly of claim 7, wherein said guide member is an arcuate band, said rings extending outwardly from an outwardly facing surface of said arcuate band.

9. The assembly of claim 7, further comprising:
- a threaded aperture extending through one of said end portions of said mounting bracket; and
- said clamping member being a thumbscrew having a head and a threaded post extending from said head, said threaded post being engageable to said threaded aperture.

10. The assembly of claim 8, wherein said mounting bracket is coupled to an inwardly facing surface of said guide member.

\* \* \* \* \*